No. 678,508. Patented July 16, 1901.
J. T. McROY.
UNDERGROUND CONDUIT.
(Application filed Dec. 19, 1900.)
(No Model.)
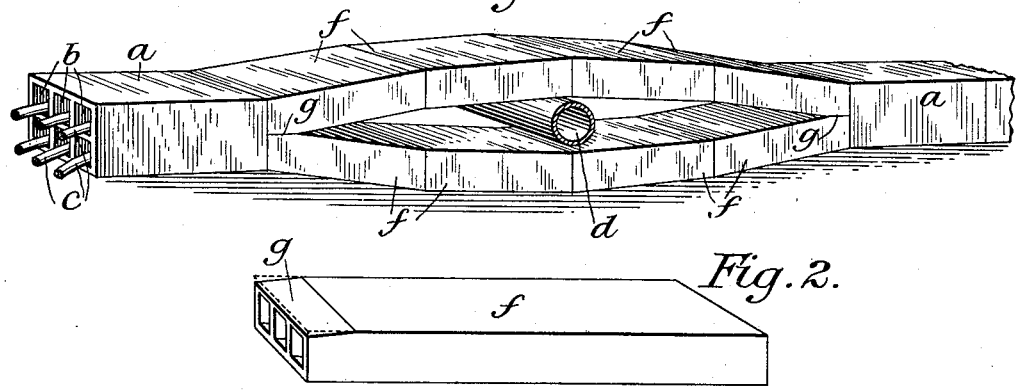
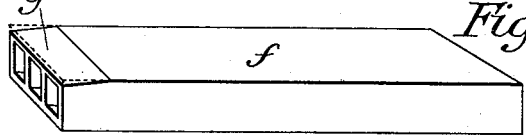
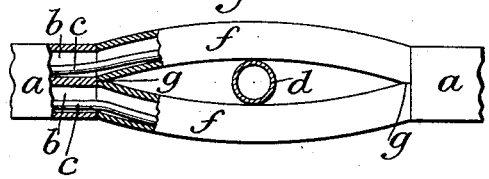 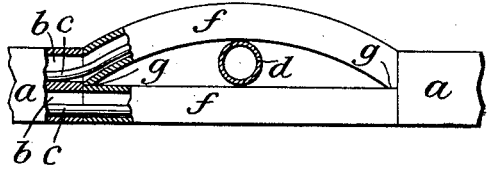
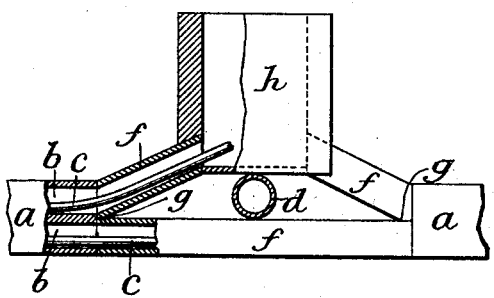 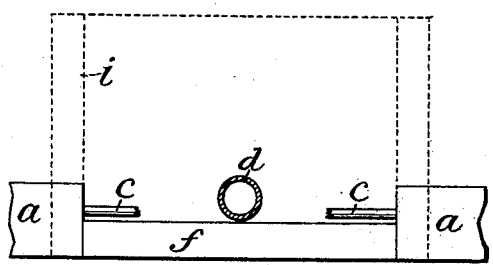
Attest:
A. N. Jesbera
John M. Scoble
Inventor:
John T. McRoy
by Redding, Kiddle & Greeley
Attys.

UNITED STATES PATENT OFFICE.

JOHN T. McROY, OF CHICAGO, ILLINOIS.

UNDERGROUND CONDUIT.

SPECIFICATION forming part of Letters Patent No. 678,508, dated July 16, 1901.

Application filed December 19, 1900. Serial No. 40,398. (No model.)

*To all whom it may concern:*

Be it known that I, JOHN T. McROY, a resident of the city of Chicago, county of Cook, and State of Illinois, have invented certain new and useful Improvements in Underground Conduits, of which the following is a specification.

The invention relates to improvements in conduits in which electric wires are placed underground, and especially to improvements in multiple-duct conduits.

The invention consists in constructing the conduit so that an obstruction in the line of the same may be passed without interrupting the continuity of the conduit, and also consists in the other new and novel features of construction hereinafter described and claimed.

In the accompanying drawings, Figure 1 represents a view in perspective of a conduit embodying the improvements. Fig. 2 represents a view in perspective of a section of the conduit. Fig. 3 represents a side elevation of a portion of a conduit provided with a small transverse opening, the conduit being broken away to show the distribution of the wires or cables contained therein. Fig. 4 is a corresponding view representing a different form of opening. Figs. 5 and 6 are corresponding views showing different arrangements of a manhole in connection with a conduit.

The conduit consists of a number of blocks or sections $a$, having a plurality of ducts $b$ formed therein for the reception of wires or cables $c$. In order to pass an obstruction in the line of the conduit, such as the pipe $d$, the conduit is divided into two or more branches, each consisting of sections or blocks $f$ of less thickness, and consequently having a less number of ducts than the larger sections. Said branches may comprise a plurality of sections arranged so that the openings through same will register and form corresponding ducts, as shown in Fig. 1, or each branch may consist of a single curved section, as shown in Figs. 3 and 4. In either case the ends of the smaller sections adjacent to the larger sections are beveled, as at $g$, in order that same may fit snugly against the end of the larger section and form a tight joint. Only one of the branches may be curved in order to avoid the obstruction, and the other branch may consist of a straight section, as shown in the drawings. If necessary or desired, a manhole may be constructed above an obstruction, as shown at $h$ in Fig. 5, and one of the branches of the conduit arranged to communicate therewith, so that access can be had to the wires contained therein. In case it is desirable to build the manhole around the obstruction, however, one branch of the conduit may be omitted altogether, as shown in Fig. 6, and the manhole $i$ be built so as to inclose the obstruction and at the same time provide access to the wires contained in a portion of the ducts of the larger sections.

Heretofore great difficulty has been experienced in constructing multiple-duct conduits, owing to the large number of obstacles usually to be found transverse to the line of the conduit, especially in the larger cities. Since the line of a multiple-duct conduit cannot readily be changed in order to go around every obstruction that may be met, partly on account of the size of the conduit and also the increased cost of laying same, the usefulness of such conduits has been somewhat impaired. By this construction an opening transverse to the line of the conduit and in the plane thereof can be provided in the conduit without interrupting the continuity of the ducts, thereby rendering a multiple-duct conduit available for use in all places regardless of the number of obstructions that may be met transverse to the line thereof. A conduit constructed as above described is easily laid, and owing to the greater number of ducts in proportion to the space occupied by the conduit its cost is consequently less.

I claim as my invention—

1. In a multiple-duct conduit, the combination with a section provided with a plurality of ducts, of two smaller sections having their adjacent faces beveled to permit said sections to be placed at an angle to the plane of the first section, and the ducts in said sections to register with the ducts in the larger section, substantially as described.

2. A multiple-duct conduit, consisting of a plurality of sections arranged so that the openings through said sections will register, and divided into two branches, the sections of said branches having their adjacent faces beveled to permit said sections to be placed at an angle to the plane of the first section, and the openings through said sections to register with the openings through the larger sections, substantially as described.

3. A multiple duct consisting of a plurality of sections arranged so that the openings through said sections will register, and divided into branches, one of said branches communicating with a manhole, and the sections of said branches having their adjacent faces beveled to permit said sections to be placed at an angle to the plane of the first section, and the openings through said sections to register with the openings through the larger sections, substantially as described.

In testimony whereof I sign this application, in the presence of two witnesses, this 12th day of December, 1900.

JOHN T. McROY.

Witnesses:
A. N. JESBERA,
LUCIUS E. VARNEY.